US005774065A

United States Patent [19]

Mabuchi et al.

[11] Patent Number: 5,774,065

[45] Date of Patent: Jun. 30, 1998

[54] REMOTE CONTROL SYSTEM AND METHOD USING VARIABLE ID CODE

[75] Inventors: Tomoji Mabuchi, Kariya; Hisataka Hotta, Gifu, both of Japan

[73] Assignee: Nippondenso Co., Ltd., Kariya, Japan

[21] Appl. No.: 510,469

[22] Filed: Aug. 2, 1995

[30] Foreign Application Priority Data

| | | | |
|---|---|---|---|
| Aug. 5, 1994 | [JP] | Japan | 6-184849 |
| Jul. 3, 1995 | [JP] | Japan | 7-167434 |

[51] Int. Cl.[6] ..... G08C 19/00; G06F 7/04; H04K 1/00

[52] U.S. Cl. ..... 340/825.72; 340/825.67; 340/825.31; 340/825.34; 340/825.22; 307/9.1; 307/10.2; 70/278; 380/21; 380/23; 380/42; 380/49

[58] Field of Search ..... 340/825.72, 825.69, 340/825.22, 825.34, 825.31; 307/9.1, 10.1, 10.2; 70/256, 262, 263, 264, 276, 277, 278; 380/21, 23, 42, 49

[56] References Cited

U.S. PATENT DOCUMENTS

| | | | |
|---|---|---|---|
| 4,723,121 | 2/1988 | Van Den Boom et al. | 340/825.31 |
| 4,758,835 | 7/1988 | Rathmann et al. | 340/825.31 |
| 5,055,701 | 10/1991 | Takeuchi | 307/10.2 |
| 5,191,610 | 3/1993 | Hill et al. | 380/21 |
| 5,305,459 | 4/1994 | Rydel | 395/750 |
| 5,369,706 | 11/1994 | Latka | 380/23 |
| 5,379,033 | 1/1995 | Fujii et al. | 340/825.69 |
| 5,412,379 | 5/1995 | Waraksa et al. | 340/825.72 |
| 5,508,692 | 4/1996 | Wolfram | 340/825.31 |
| 5,554,977 | 9/1996 | Jablonski et al. | 340/825.31 |

FOREIGN PATENT DOCUMENTS

| | | |
|---|---|---|
| 570761 | 11/1993 | European Pat. Off. . |
| 60-10081 | 1/1985 | Japan . |
| 62-23847 | 1/1987 | Japan . |
| 62-280469 | 12/1987 | Japan . |
| 1278671 | 11/1989 | Japan . |
| 4-31582 | 2/1992 | Japan . |
| 4-81344 | 3/1992 | Japan . |
| 5-287948 | 11/1993 | Japan . |
| 6-229153 | 8/1994 | Japan . |
| 746672 | 2/1995 | Japan . |
| 2265482 | 9/1993 | United Kingdom . |
| 94/18036 | 8/1994 | WIPO . |

*Primary Examiner*—Michael Horabik
*Assistant Examiner*—Yonel Beaulieu
*Attorney, Agent, or Firm*—Cushman, Darby & Cushman IP Group of Pillsbury Madison & Sutro LLP

[57] ABSTRACT

In a remote control system, each time a transmission code is transmitted, a rolling code having a prescribed bit configuration is cumulatively varied. An operation process is performed between each bit data item of the rolling code and each corresponding bit data item of the ID code, whereby each bit data item of the ID code is varied in correspondence with the rolling code, thus setting a variable ID code. Since the ID code itself which is contained in the signal is also varied in correspondence with the variable code, the fixed portion contained in the signal is decreased with the result that the ID code is almost infinitely widely varied. Accordingly, it becomes almost impossible to decode the ID code even if it is intercepted.

17 Claims, 8 Drawing Sheets

FIG. 4

EXAMPLE OF REARRANGEMENT PATTERN TABLE (I'5 – I'0 AND R2 – R0 ARE REARRANGED)

| C3 | C2 | C1 | C0 | REARRANGING ORDER | | | | | | | | |
|---|---|---|---|---|---|---|---|---|---|---|---|---|
| 0 | 0 | 0 | 0 | I'3 | R2 | I'0 | R0 | I'2 | I'5 | R1 | I'4 | I'1 |
| | | | 1 | I'1 | R0 | I'5 | I'3 | R2 | I'4 | I'2 | I'0 | R1 |
| | | 1 | 0 | R2 | I'0 | I'2 | I'4 | R1 | I'1 | R0 | I'3 | I'5 |
| | | | 1 | I'4 | R1 | I'1 | I'0 | R2 | I'3 | I'5 | R0 | I'2 |
| | 1 | 0 | 0 | I'5 | I'3 | R0 | I'2 | I'4 | R1 | I'0 | I'1 | R2 |
| | | | 1 | I'0 | I'1 | R2 | I'5 | I'3 | R0 | I'4 | I'2 | R1 |
| | | 1 | 0 | R1 | I'2 | I'4 | R2 | I'1 | I'5 | I'3 | R0 | I'0 |
| | | | 1 | I'3 | I'5 | R2 | R0 | I'0 | I'2 | I'1 | R1 | I'4 |
| 1 | 0 | 0 | 0 | I'1 | R1 | I'3 | R2 | I'5 | I'0 | I'4 | R0 | I'2 |
| | | | 1 | I'2 | I'4 | R1 | I'1 | R0 | I'3 | R2 | I'5 | I'0 |
| | | 1 | 0 | R0 | I'0 | R2 | I'3 | R1 | I'1 | I'5 | I'2 | I'4 |
| | | | 1 | I'4 | I'5 | I'2 | R1 | I'0 | R0 | I'3 | R2 | I'1 |
| | 1 | 0 | 0 | I'2 | R0 | I'3 | R2 | I'1 | I'4 | R1 | I'0 | I'5 |
| | | | 1 | R0 | R2 | I'1 | I'4 | I'5 | I'0 | I'2 | R1 | I'3 |
| | | 1 | 0 | I'5 | I'2 | I'0 | I'1 | I'4 | R0 | R2 | I'3 | I'1 |
| | | | 1 | I'0 | I'3 | I'4 | R0 | I'2 | R2 | R1 | I'1 | I'5 |

TRANSMISSION CODE INCLUDING C3 – C1

| | | | | | | | | | | | | | | | | | | | | | | | |
|---|---|---|---|---|---|---|---|---|---|---|---|---|---|---|---|---|---|---|---|---|---|---|---|
| 0 | 0 | 0 | 0 | 1 | | | | | 1 | | | | | 1 | | K1 | K0 | P | 1 | C3 | C2 | C1 | C0 |

REARRANGED BITS

FIG. 8

EXAMPLE OF COMBINATION PATTERN TABLE
(R2-R0 ARE COMBINED WITH I5-I0 )

| CODE | | | | COMBINATION | | | | | |
|---|---|---|---|---|---|---|---|---|---|
| D3 | D2 | D1 | D0 | I5 | I4 | I3 | I2 | I1 | I0 |
| 0 | 0 | 0 | 0 | R2 | R2 | R1 | R1 | R0 | R0 |
| | | | 1 | R2 | R2 | R1 | R0 | R0 | R1 |
| | | 1 | 0 | R2 | R2 | R0 | R1 | R0 | R1 |
| | | | 1 | R2 | R2 | R1 | R0 | R1 | R0 |
| | 1 | 0 | 0 | R0 | R0 | R1 | R2 | R1 | R2 |
| | | | 1 | R1 | R2 | R0 | R0 | R2 | R1 |
| | | 1 | 0 | R2 | R2 | R0 | R0 | R1 | R1 |
| | | | 1 | R1 | R0 | R2 | R0 | R2 | R1 |
| 1 | 0 | 0 | 0 | R0 | R2 | R1 | R0 | R2 | R1 |
| | | | 1 | R2 | R2 | R0 | R1 | R1 | R0 |
| | | 1 | 0 | R0 | R1 | R2 | R0 | R2 | R1 |
| | | | 1 | R1 | R0 | R0 | R2 | R1 | R2 |
| | 1 | 0 | 0 | R0 | R0 | R2 | R1 | R2 | R1 |
| | | | 1 | R1 | R0 | R1 | R0 | R2 | R2 |
| | | 1 | 0 | R0 | R1 | R0 | R2 | R1 | R2 |
| | | | 1 | R1 | R2 | R1 | R0 | R0 | R2 |

TRANSMISSION CODE INCLUDING D3-D0

| | | | | | | | | | | | | | | | | | | | | | | | | |
|---|---|---|---|---|---|---|---|---|---|---|---|---|---|---|---|---|---|---|---|---|---|---|---|---|
| 0 | 0 | 0 | 0 | 0 | 1 | I′3 | R2 | I′0 | R0 | 1 | I′2 | I′5 | R1 | I′4 | 1 | I′1 | K1 | K0 | P | 1 | D3 | D2 | D1 | D0 |

REMOTE CONTROL SYSTEM AND METHOD USING VARIABLE ID CODE

CROSS REFERENCE TO RELATED APPLICATIONS

This application is based on and claims priorities of Japanese Patent Applications No. 6-184849 filed Aug. 5, 1994 and No. 7-167434 filed Jul. 3, 1995, the contents of which are incorporated herein by reference.

BACKGROUND OF THE INVENTION

1. Field of the Invention

The present invention relates to a remote control system and method which uses a variable ID (identification) code and is used in, for example, a protection system such as a wireless door lock control system for a vehicle.

2. Description of Related Art

Conventionally, in a remote control system which is adopted in, for example, a wireless door lock control system, an individual ID code is set in a coded signal transmitted and received through radio communication, and the coded signal containing this ID code is transmitted from a transmitter. The transmitted coded signal is received by a receiver, and the ID code contained in the received coded signal and an ID code preset in the receiver are compared with each other. Then, when both ID codes coincide with each other, the system operates the object to be controlled to thereby prevent another from using the ID code signal.

However, it has in recent years been reported that the above ID code can be copied by an interceptor device which intercepts an ID code contained in the coded signal transmitted through radio communication, and that an unauthorized person other than the authorized user can use the signal without authorization by transmitting the same ID code. This means that the security of the conventional type of remote control system directed only to transmitting and receiving an individual ID code can be breached.

As a countermeasure against this, for example, Japanese Unexamined Patent Application Laid-open No. H1-278671 discloses a remote control system which comprises, in addition to a fixed ID code, a code-number cumulative alteration means for cumulatively altering the code number in correspondence with the transmission frequency according to a prescribed sequential order. Namely, in the remote control system disclosed in the above publication, a code number (rolling code) which is altered in correspondence with the transmission frequency according to a prescribed sequential order is added, in addition to the ID code, to the transmission code, and this code number is utilized for judgement of a transmission signal. For this reason, even if the transmission signal is copied by the transmission signal interceptor device, mere transmission of such copied signal cannot use the ID code signal because code information is altered for each transmission and this altered information is utilized for determination of the transmission signal.

However, in the conventional system, although the system is comprised of a variable code number, the ID code per se that is fixed is still contained in the transmission signal. Therefore, if the transmission signal is intercepted many times by the ID code interceptor device, decoding thereof will be possible by determining that the code which is continuously fixed is the ID code and that the varying code is the rolling code and by finding the regularity in the variation of the varying code. Namely, since the information of the ID code which is fixed exists in the transmission signal, an unauthorized person who uses it without authorization can relatively easily determine what portion of the signal is the ID code and what portion of the signal is the rolling code. Further, if the regularity of a variable portion of the code other than the ID code has been found after noticing this variable portion, the unauthorized user would be able to use the ID code signal.

SUMMARY OF THE INVENTION

An object of present invention is to provide a remote control system in which the ID code itself which is contained in a signal is also varied in correspondence with a variable code to thereby substantially eliminate a fixed code portion in the signal, thus increasing the difficulty of intercepting and decoding the signal.

According to the present invention, in a remote control system, each time a transmission code is transmitted, a rolling code composed of a prescribed number of bits is cumulatively varied. Then, each bit data item of the rolling code and each corresponding bit data item of an ID code are operation processed thereby to vary each bit data item of the ID code in correspondence with the rolling code, thus setting a variable ID code. Namely, the ID code in the transmission signal is also varied in correspondence with the rolling code and therefore substantially the entire information in the transmission signal is variable information. Thus, what portion of the signal is the ID code and what portion thereof is the rolling code cannot be discriminated. Further, it is almost impossible to find a regularity in the variation of the rolling code. Accordingly, it is possible to prevent an unauthorized person other than the authorized user from using the signal without authorization.

Preferably, the variable ID code is set by combining the bits of the rolling code in the same number as that of the bits of the ID code according to a prescribed combination setting and performing an exclusive-OR operation between each bit data item of the combined rolling code and each corresponding bit data item of the ID code. Namely, by utilizing the exclusive-OR operation, coding and decoding processes are more efficiently performed compared with various other operation processes.

Further, the rolling code is cumulatively varied and the restored rolling code and the rolling code preset in a receiver are compared with each other for determining whether or not the rolling code is correct. Namely, since the degree of coincidence between both rolling codes as well as that between both ID codes is determined by comparison, the level of security is excellent. In the case where it has been determined that the restored rolling code is correct, the following effect is brought about by storing the restored rolling code. That is, even when the rolling code of the transmitter has preceded the rolling code of the receiver (for example, where the rolling code has not been received despite having been transmitted), a correspondence therebetween can be attained.

Preferably, a plurality of kinds of bit-data rearranging order settings are provided as the prescribed bit-data rearranging order settings. Although a larger space is needed as the memory space since a plurality of kinds are set, the transmission code is varied in a more complex manner, whereby the difficulty of decoding increases. Further, if the prescribed bit-data rearranging order setting is selected by a random number, the transmission code cannot be decoded unless a relevant random number is obtained.

More preferably, it is determined whether or not a prescribed time period has passed from the start of transmission. Where it has been determined that the transmission time period is not longer than the prescribed time period, the bit data items are rearranged according to a relevant prescribed bit-data rearranging order setting as preset, and the rearranged code is not added to the transmission code. Where it has been determined that the transmission time period is longer than such prescribed time period, the relevant prescribed bit-data rearranging order setting is updated and the bit data items are rearranged according to this updated prescribed bit-data rearranging order setting, and the updated rearranged code is added to the transmission code. In other words, only when the transmission code has continued to be transmitted for at least the prescribed time period, the relevant prescribed bit-data rearranging order setting is updated. As a result, by appropriately changing the transmission time period, the user can freely change the bit-data rearranging order setting. In addition, if the user changes this once, he can prevent the rearranged code from being added to the transmission code from the next time onward only if the transmission time period is not longer than the prescribed time period. Therefore, the transmission code has no information due to the bit-data rearrangement, so that even if the transmission code has been intercepted, decoding thereof becomes virtually impossible.

BRIEF DESCRIPTION OF THE DRAWINGS

In the accompanying drawings:

FIG. 4 is a table illustrating patterns according to which the orders of bit-position rearrangement are set;

FIG. 8 is a table illustrating patterns according to which the bit-position combinations are set.

DETAILED DESCRIPTION OF THE PREFERRED EMBODIMENTS

Figure 1:
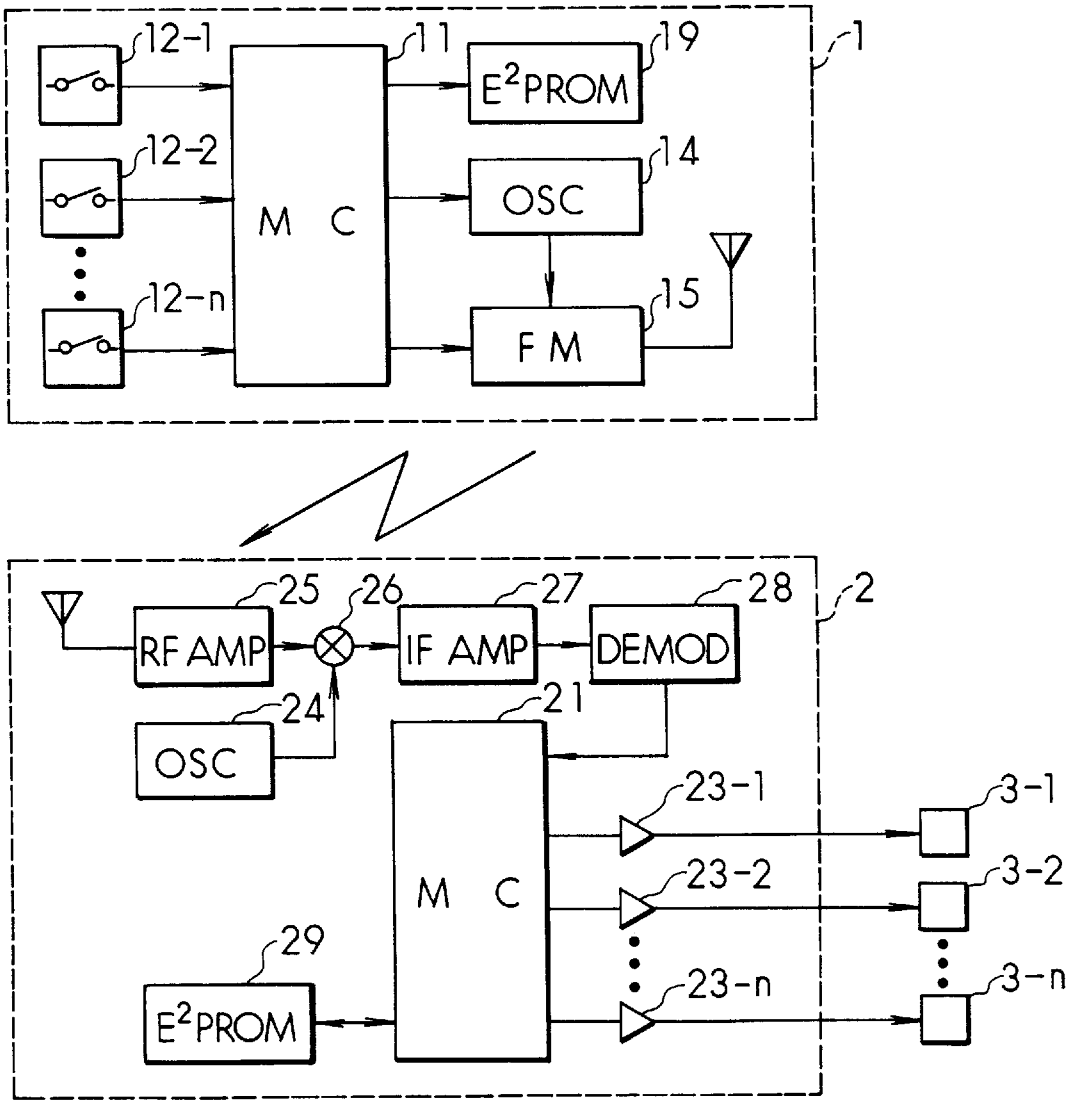
FIG. 1 is a schematic structural diagram illustrating an embodiment of the present invention.

The present invention will now be described hereafter with reference to the embodiments illustrated in the drawings.

[First Embodiment]

FIG. 1 is a structural diagram representing a remote control system (transmission and reception system) which is applied to a protection system such as, for example, a wireless door lock control system for a vehicle.

In FIG. 1, reference numeral 1 denotes a transmitter, in which there are provided switches 12-1, 12-2, - - - , 12-n for performing remote control operations on their respective different functions (for example, door lock, opening/closing of trunk, seat position setting, etc.). Signals generated as a result of the switch operations are input to a microprocessor (MC) 11. To this microprocessor 11 there is connected an EEPROM 19, in which there is stored an ID code specific to the transmitter 1. RAM (not illustrated) is formed in the microprocessor 11 and this RAM stores a rolling code which varies each time it is transmitted, as well as the data for transmission code production. Further, an oscillator circuit 14 and an FM modulator circuit 15 are connected to the microprocessor 11 so as to FM modulate a transmission code produced in the microprocessor 11 and transmit it from an antenna.

Meanwhile, a receiver 2 is provided with receiver circuitry for demodulating the transmitted signal from the transmitter 1. The receiver circuitry is formed by a radio frequency amplifier circuit 25, local oscillator 24, mixer circuit 26, intermediate frequency amplifier circuit 27, and demodulator circuit 28. The output signal as demodulated by this receiver circuitry 2 is input to a microprocessor 21. This microprocessor 21 produces an ID code and rolling code from the output signal as demodulated according to previously determined processes. An EEPROM 29 which stores a code corresponding to the ID code specific to the transmitter 1 is connected to the microprocessor 21. Further, control objects 3-1, 3-2, - - - , 3-n (for example, actuators for performing door locking, trunk opening/closing, seat position setting, etc.) are connected to the microprocessor 21 via drive circuits 23-1, 23-2, - - - , 23-n, respectively. The control objects 3-1, 3-2, - - - , 3-n are operated according to signals from the microprocessor 21.

Figure 2A:
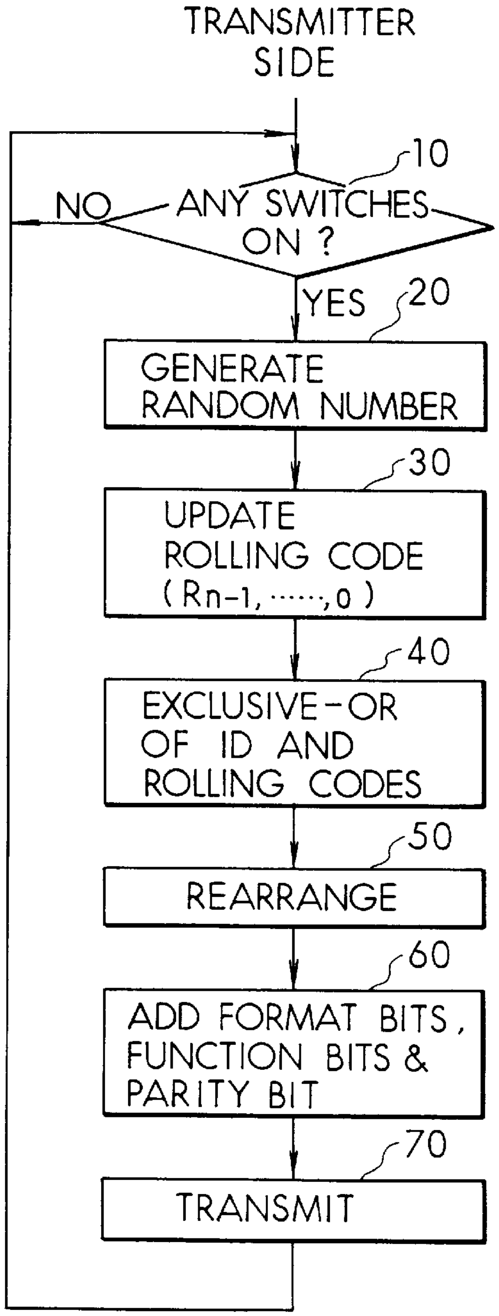
FIGS. 2A and 2B are flowcharts illustrating operations of a transmitter and a receiver illustrated in FIG. 1, respectively.
Figure 2B:
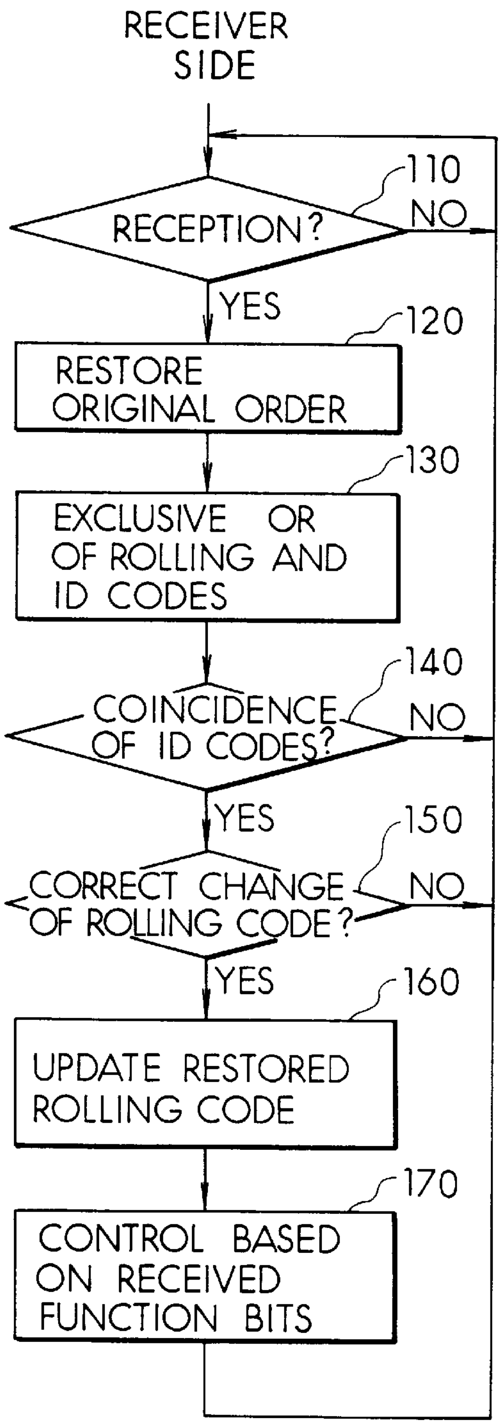

Next, operation of the transmitter 1 and receiver 2 will be described according to the flow charts illustrated in FIGS. 2A and 2B. The processes illustrated in the flowchart are processes which are executed by the microprocessors 11 and 21 respectively provided in the transmitter 1 and receiver 2.

Firstly, the operation of the transmitter 1 will be explained. In step 10, the operation is in standby until it is determined that any one of the switches 12-1 through 12-n has been operated, and when it is determined that any one of such switches has been operated, the operation proceeds to step 20. In step 20, a 4-bit random number (C3, C2, C1, C0) is generated and a bit-data rearranging order corresponding to the thus generated 4-bit random number is set according to the contents of a table shown in FIG. 4. In this embodiment, it is assumed that, for example, a 4-bit random number (0, 0, 0, 0) has been generated and an uppermost stage pattern shown in the table in FIG. 4 has been set for the bit-data rearranging order.

Next, in step 30, updating of the rolling code is performed. This rolling code is a variable composed of n bits (Rn-1 to R0). The variable is updated each time the rolling code is transmitted. Although in this embodiment it is assumed that the rolling code is a variable composed of 3 bits (1, 0, 0) and varies by +1 each time it is transmitted, the present invention is not limited thereto but any manner of variation may be available as long as the rolling code varies in accordance with a prescribed rule.

Figure 3:
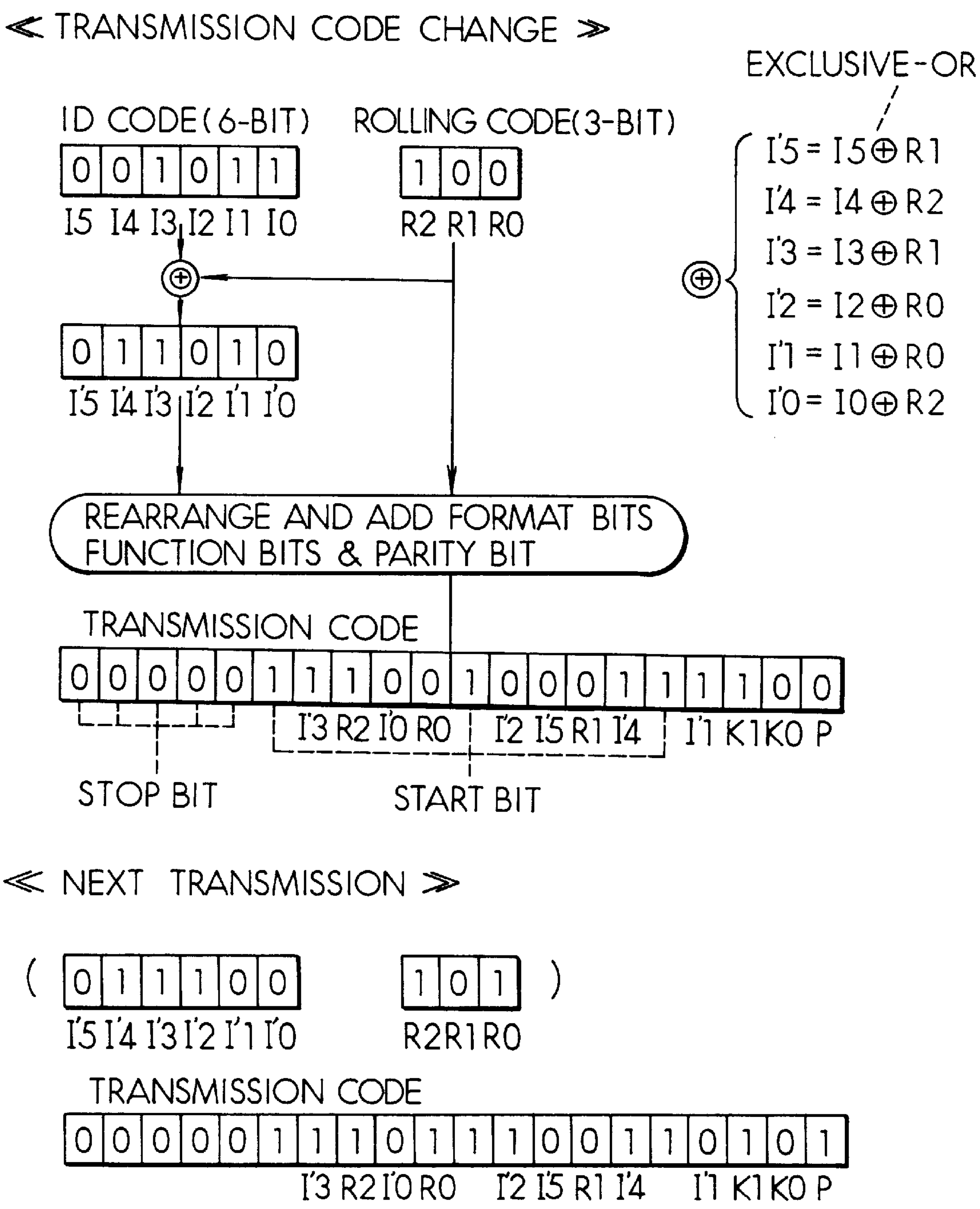
FIG. 3 is a schematic view illustrating states of codes at a transmission-code composing time.

Further, in step 40, exclusive-OR operation is performed between the rolling code and the ID code. Specifically, as illustrated in FIG. 3, a previously determined bit combination (with no regularity), e.g. a 6-bit combination (R1, R2, R1, R0, R0, R2) is set for the rolling code, whereby an exclusive-OR operation is performed between each bit value thereof and each corresponding bit value of the ID code. The ID code is a code specific to the transmitter 1 and is stored in EEPROM 19 as mentioned above. This ID code is a fixed value composed of m bits (Im-1 to I0). In this embodiment, a 6-bit value (0, 0, 1, 0, 1, 1) is set for this ID code.

Therefore, in step 40, exclusive-OR operation is performed between the ID code (0, 0, 1, 0, 1, 1) and the combination rolling code (0, 1, 0, 0, 0, 1), so that an exclusive-OR of (0, 1, 1, 0, 1, 0) is set.

Next, in step 50, the exclusive-OR result set in step 40 and the rolling code are rearranged according to the bit-data rearranging order set in step 20. Specifically, as illustrated in FIG. 3, the (0, 1, 1, 0, 1, 0) and (1, 0, 0) are rearranged according to the bit-data rearranging order (I'3, R2, I'0, R0, I'2, I'5, R1, I'4, I'1), whereby (1, 1, 0, 0, 0, 0, 0, 1, 1) is set.

Next, in step 60, format bits (start bits, stop bits), function bits, and a parity bit are added to the code rearranged in step 50 and further the 4-bit random number (C3, C2, C1, C0) is added to thereby compose a transmission code. Specifically, as illustrated in FIGS. 3 and 4, stop bits are disposed and then the rearranged code is disposed in such a manner as to be sectioned by the start bits. Further, the function bits, parity bit, and 4-bit random number (which indicates information on the bit-data rearranging order) are added to thereby compose a transmission code. The format bits are those for synchronizing data transmission while, on the other hand, the function bits (K1, K0) are those which represent which one of the operation switches has been operated. The parity bit is one for detecting a transmission error.

Next, in step 70, the transmission code which has been composed in step 60 is output to the FM modulator circuit 15. As a result, the transmission code is FM modulated and transmitted to the exterior of the transmitter 1 as a feeble wave.

The above-mentioned series of steps are intended for performing the processes to be executed in the transmitter 1 when one of the operation switches has been once operated. Therefore, when that operation switch is again depressed, the processes in steps 20 through 70 are again executed and, in this case, the 4-bit random number and the rolling code are changed. The transmission code to be transmitted next is illustrated in a simplified manner in the lower portion of FIG. 3, provided, however, it is assumed that the 4-bit random number is identical.

Figure 5:
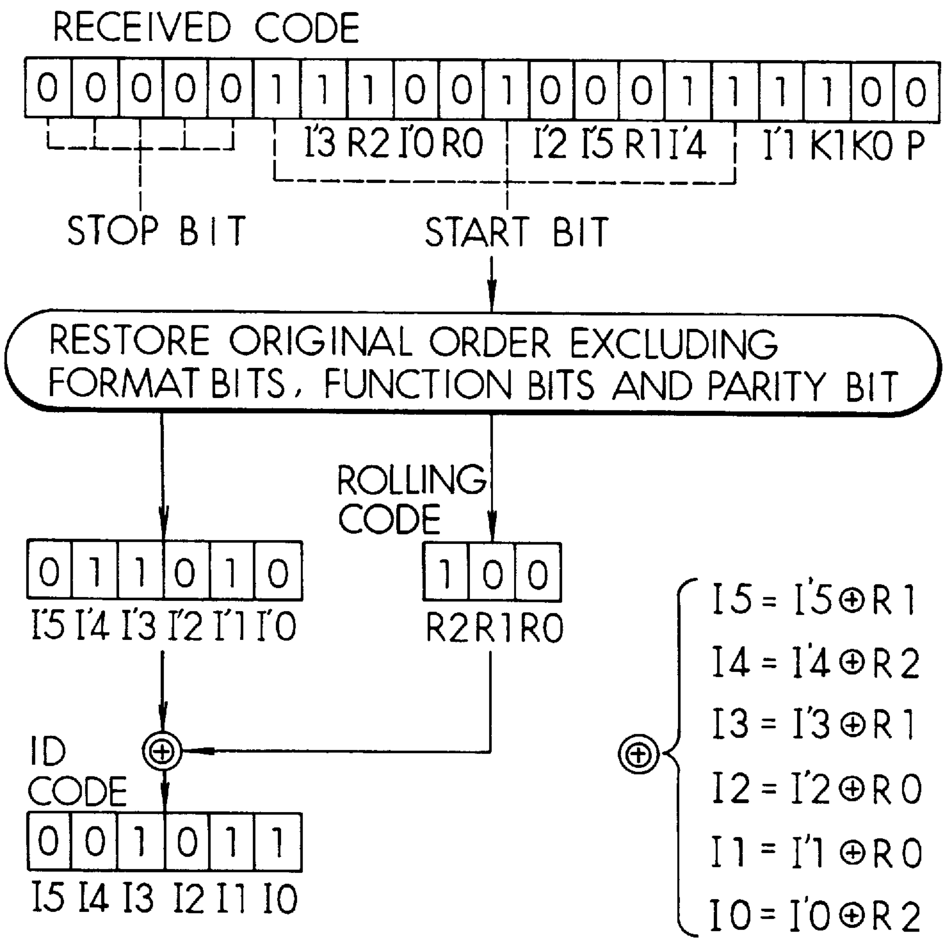
FIG. 5 is a schematic view illustrating states of codes at the transmission-code decoding time.

Next, the operation of the receiver 2 will be explained with reference to FIG. 2B. In step 110, the operation is in standby until the transmission code from the transmitter 1 is received by the receiver 2. When the transmission code has been received, the operation proceeds to step 120. In step 120, the function bits, rearranged code (exclusive-ORed code+rolling code), and 4-bit random number which have been disposed at their respective prescribed positions are respectively drawn away from the transmission code, whereupon the rearranged code is restored to its original arrangement order according to the 4-bit random number, to restore the exclusive-ORed code and the rolling code. Specifically, as illustrated in FIG. 5, the rearranged code (1, 1, 0, 0, 0, 0, 0, 1, 1) is restored to its original arrangement order according to the 4-bit random number (0, 0, 0, 0) to restore the exclusive-ORed code (0, 1, 1, 0, 1, 0) and the rolling code (1, 0, 0).

Next, in step 130, the above-mentioned exclusive-ORed code is subjected to exclusive-OR operation by using the rolling code to restore the ID code. Specifically, as illustrated in FIG. 5, exclusive-OR operation is performed between each bit value of the same rolling code bit combination as that exclusive-ORed in step 40, i.e. 6-bit combination (R1, R2, R1, R0, R0, R2) and each corresponding bit value of the exclusive-ORed code. Namely, the ID code (0, 0, 1, 0, 1, 1) is restored from the exclusive-ORed code (0, 1, 1, 0, 1, 0) and the bit values of the 6-bit combination value (0, 0, 1, 0, 1, 1). It is assumed that the same 6-bit combination rolling code is set in both the transmitter 1 and the receiver 2.

Next, in step 140, it is determined whether or not the ID code set in the EEPROM 29 and the ID code of the transmission code restored in step 130 coincide with each other. If both coincide, the operation proceeds to step 150. If there is no coincidence between the codes, the operation returns to step 110 in which the operation is placed in standby.

Further, in step 150, comparing the rolling code restored in step 120 with the previously stored rolling code, it is determined whether or not the amount of change of the restored rolling code relative to the previous rolling code is in a range of from +1 to +X. If the amount of change is in this range, it is determined that the present rolling code is correct. Thus, the operation proceeds to step 160. If the amount of change is outside the range, the operation proceeds to step 110 in which the operation is placed in standby. At this time, if the transmission code from the transmitter 1 is received by the receiver 2 each time it is transmitted, the amount of change of the rolling code to be determined by comparison in the receiver 2 may be limited to the value of the previous rolling code plus 1. However, since in the case where the transmitter is operated without being accompanied by reception of the transmission code by the receiver 2, only the rolling code on the transmitter 1 is updated, such a permissible range is provided which could cope with such a case as well. Namely, assuming that the value of the rolling code restored from the transmission code is represented by ri and the value of the previous rolling code is represented by ri-1, if "$ri-1+1 \leqq ri \leqq ri-1+X$", it is determined that the rolling code is normal.

Next, in step 160, the rolling code restored from the transmission code is stored in a RAM and the rolling code as stored is updated thereby. As a result, for example, where only the rolling code on the transmitter 1 is updated but the value of the rolling code restored from the transmission code falls within the permissible range and is determined as being normal, an error occurs between the rolling code set in the transmitter 1 and that set in the receiver 2. However, since in such a case the rolling code on the receiver 2 is updated by the rolling code restored from the transmission code, the rolling code on the transmitter 1 and that on the receiver 2 coincide with each other. Further, in step 170, the control objects 3-1, 3-2, - - - , 3-n are operated in corresponding relation to the function bits (K1, K0) set in the transmission code via the drive circuits 23-1, 23-2, - - - , 23-n. Although this embodiment has been directed to controlling several control objects, a transmission code with no function bit can also be realized by providing a single function as the function of the system.

[Second Embodiment]

This embodiment is directed to determining whether or not a transmission signal has continued to be transmitted for a prescribed time period (whether or not the switch has been continually depressed for the prescribed time period) and, where the transmission signal has continued to be transmitted for at least the prescribed time period, updating (reregistering) the bit-data rearranging order setting registered on the receiver side and to this end transmitting a new bit-data rearranging order setting from the transmitter 1 to the receiver 2.

Figure 6:
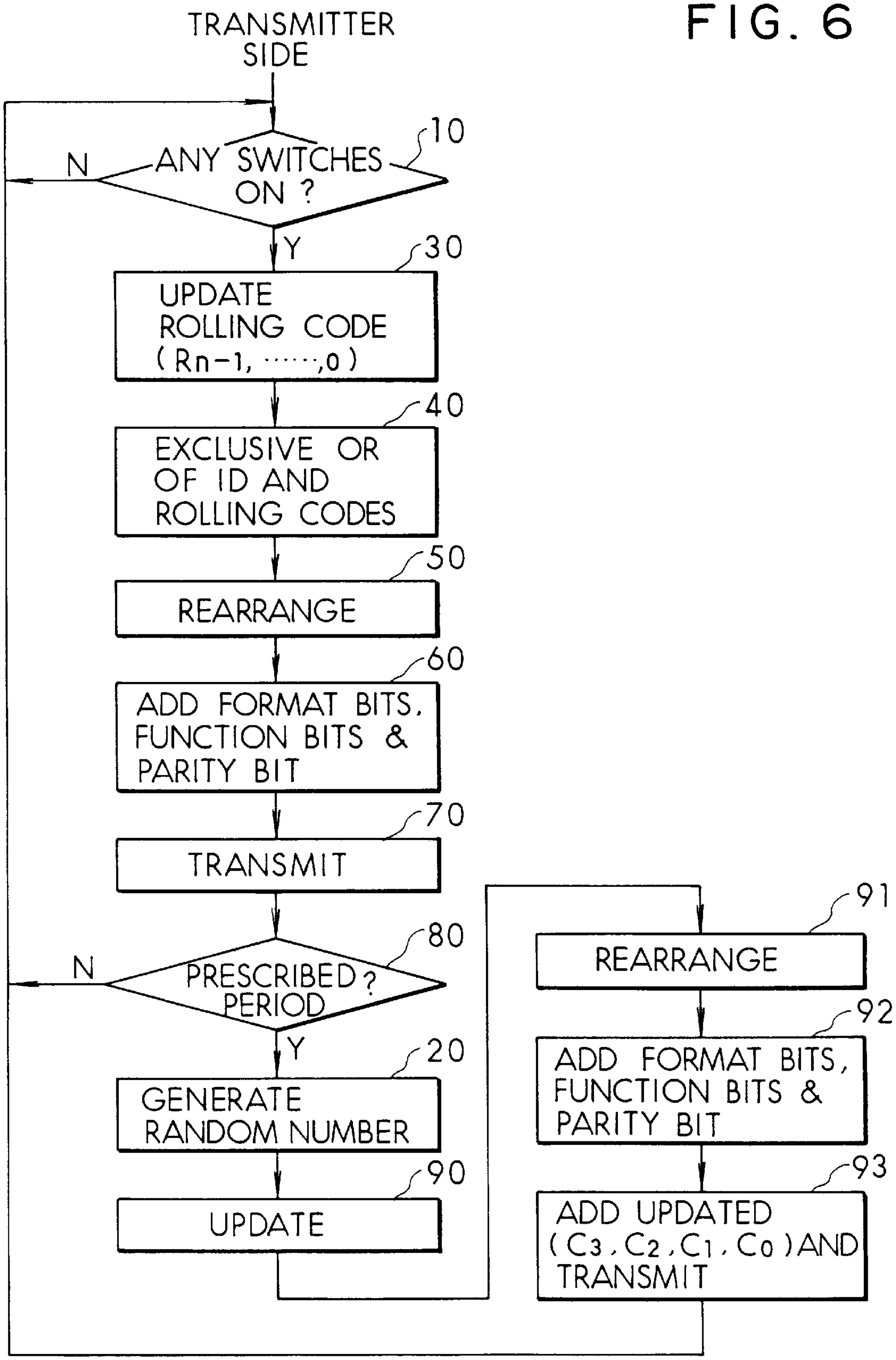
FIG. 6 is a flow chart illustrating the operation of the transmitter, in the case where a sorting code is added after the passage of a prescribed time period.
Figure 7:
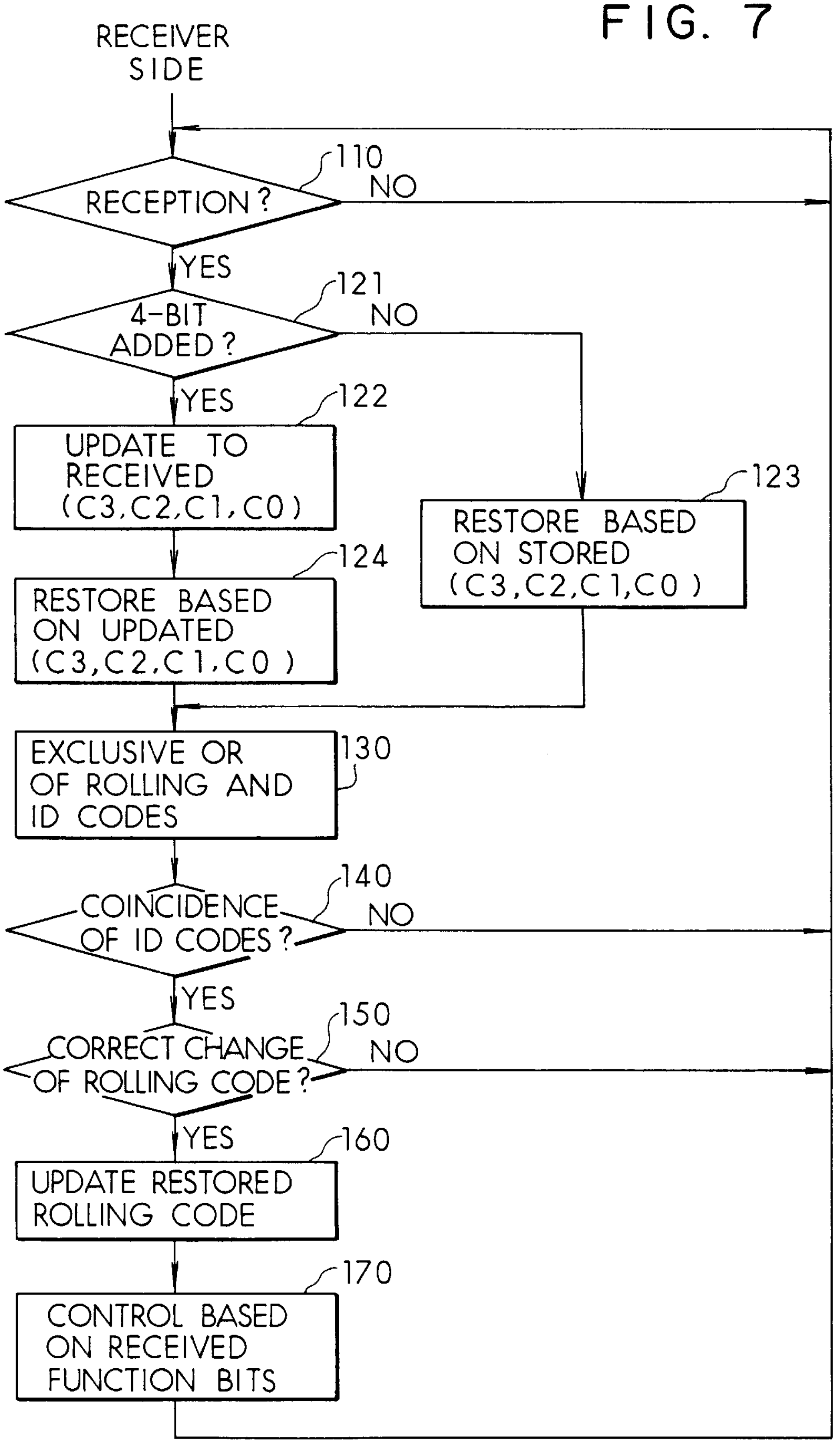
FIG. 7 is a flow chart illustrating the operation of the receiver, in the case where a sorting code is added after the passage of a prescribed time period.

The operations of the transmitter 1 and the receiver 2 will now be explained according to the flow chart illustrated in FIGS. 6 and 7, in which the same reference numerals are used to denote the same or similar steps as in the first embodiment.

First, in step 10 through 70, the similar processes are performed as in the first embodiment. That is, it is determined whether or not any one of the switches has been depressed as in the first embodiment. Where the switch has been depressed, the rolling code is updated and an exclusive-OR operation is performed between the rolling code and the ID code. Then, the resulting code bit data items are rearranged according to a relevant bit-data rearranging order setting to thereby perform a transmission-code transmission processing. However, the operation of setting the bit-data rearranging order according to a 4-bit random number and the operation of adding this 4-bit random number to the transmission code are not included among the operations in steps 10 through 70.

Namely, if the switch has only been depressed, the bit-data rearranging order setting remains as it previously was and is not updated. Therefore, the bit-data rearranging operation is performed according to the same bit-data rearranging order setting as in the previous transmission. Therefore, with no 4-bit random number being added to the transmission code, the receiver 2 restores according to the previous bit-data rearranging order setting. Namely, data corresponding to this 4-bit random number need not be added to the transmission code. Accordingly, in usual uses (where the switch is continually depressed, for example, for only several seconds or so), it is impossible for an unauthorized person to decode it merely by interception thereof because data corresponding to the bit-position rearranging order setting is not contained in the transmission code.

However, if only the above-described processing is performed, the bit-data rearranging order setting remains fixed. Accordingly, there is the possibility that it may be found through tens of interceptions that the bit-data rearranging order setting involves a certain standard or rule of regularity. This problem is settled by updating (reregistering) the bit-data rearranging order setting and varying such regularity.

Specifically, in step 80, where the transmission signal is continually transmitted for more than a prescribed period (where the switch is continually depressed for, for example, the prescribed time period from step 10), the processes in steps 20 and 90 through 93 are executed to thereby set a new bit-data rearranging order, according to which the bit-data items are rearranged. A 4-bit random number (C3, C2, C1, C0) resulting from the setting of the new bit-data rearranging order is added to the transmission code, thereby updating the bit-data rearranging order setting. On the other hand, as illustrated in FIG. 7, in step 121, on the receiver side it is determined whether or not 4-bit information corresponding to the relevant bit-data rearranging order setting is added to the transmission code. If such 4-bit information is added, the bit-data rearranging order setting to which it is added is stored in the memory and the previously stored bit-data rearranging order setting is updated thereby in step 122. Then, code restoration is performed according to the thus-updated bit-data rearranging order setting in step 124. If the above-mentioned 4-bit information is not added, code restoration is performed in step 123 according to the previous bit-data rearranging order setting as stored in the memory, whereby the receiver 2 maintains a corresponding relation to the transmitter 1. When the receiver 2 has succeeded in updating, the receiver 2 may have a structure wherein it transmits to the transmitter 1 a signal indicating that the receiver 2 has succeeded in updating, or a structure wherein it informs the user that the receiver 2 has succeeded in updating.

As mentioned above, the second embodiment has a structure of determining whether or not the transmission signal has continued to be transmitted for the prescribed time period and, only when it has been continually transmitted for at least the prescribed time period, updating the bit-data rearranging order setting. As a consequence, it is possible for the user to freely change the bit-data rearranging order setting by appropriately altering the transmission time period. In addition, if the user once alters the transmission time period, any bit-data rearranging order is prevented from being added to the transmission code from the next time if the transmission time period is within the prescribed time period. For this reason, the transmission code has no information on the bit-data rearranging order, so that even when it is intercepted, decoding thereof is practically impossible.

Additionally, in the above-explained embodiment, where the transmitter 1 transmits the transmission code, a plurality of kinds of bit-data rearranging order settings each including prescribed codes are set for the prescribed bit-data rearranging order settings as illustrated in FIG. 4. For this reason, a code which indicates what kind of bit-data rearranging order has been set has to be added to the transmission code. However, if one kind of bit-data rearranging order is set and the value thereof is set to be fixed, it becomes unnecessary to add a code to the transmission code indicating which bit-data rearranging order pattern has been set, although the difficulty in decoding by interception is somewhat decreased. This makes it possible to simplify the production of a transmission code. In addition, in this case, since it is not necessary to provide bit-position rearranging order settings in the memory, it is possible to decrease the amount of data stored in the memory.

On the other hand, in the above-mentioned embodiments, when the exclusive-OR operation is performed, this operation is performed by setting the rolling code to a prescribed combination [6-bit fixed value (R1, R2, R1, R0, R0, R2)]. Therefore, the third embodiment illustrated in FIG. 8 may also be considered in which a plurality of combination patterns, each including a prescribed code, are set. When the transmitter 1 transmits the transmission code, the transmitter 1 adds a code to the transmission code which indicates which combination pattern was used to perform the operation processing has been performed. By means of such an embodiment, the code variation occurs in a more complex manner, thereby further increasing the difficulty in decoding by interception.

Further, in the above-mentioned embodiments, explanation has been given with respect to an ID code having a 6-bit configuration and with the rolling code having a 3-bit configuration. However, the present invention is not limited thereto but permits the number of the above-mentioned code bits to be set at any given value according to its purpose.

The present invention may be modified further in many other ways without departing from the spirit of the invention.

What is claimed is:

1. A remote control system comprising:

a transmitter for transmitting a transmission code including an ID code prepared by encoding specific identifying information, the transmitter comprising:

rolling code varying means for, each time the transmitter transmits the transmission code, varying a rolling code comprising a prescribed number of bits, operation processing means for performing an operation process with respect to each bit of the rolling code and each corresponding bit of the ID code, to vary each bit of the ID code in correspondence with the rolling code and thereby set a variable ID code, bit-data rearranging means for rearranging a position of each bit of the variable ID code and a position of each bit of the rolling code according to a prescribed bit-data rearranging order setting to set a rearranged code, and transmission code producing means for producing a transmission code from the rearranged code having a position of each bit rearranged by the bit-data rearranging means; and a receiver for receiving the transmission code transmitted from the transmitter, decoding the ID code and, when the ID code obtained by decoding thereof coincides with a preset ID code, outputting an instruction causing operation of a control object, the receiver comprising:

bit-data rearranging and restoring means for, when receiving the transmission code from the transmitter, extracting the rearranged code and rearranging each bit according to the prescribed bit-data rearranging order setting to thereby set a restored variable ID code and a restored rolling code, operation processing and restoring means for performing an operation inverse to the operation process performed by the transmitter, with respect to the restored variable ID code and the restored rolling code, and restoring, in correspondence with the restored rolling code, the ID code prepared in the transmitter, and comparing and determining means for comparing the ID code and the preset ID code and, when the ID code and the preset ID code coincide, outputting a signal causing operation of the control object.

2. The remote control system as set forth in claim 1, wherein the operation processing means combines a predetermined number of the bits from the rolling code by the predetermined number of the bits from the ID code according to a prescribed combination setting and performs an exclusive-OR operation between each one of the predetermined number of the bits from the rolling code and each corresponding one of the predetermined number of the bits from the ID code to thereby set the variable ID code.

3. The remote control system as set forth in claim 1, wherein:

the rolling code varying means adds or subtracts a prescribed value to or from the rolling code each time the transmitter transmits the transmission code, to vary the rolling code in only one direction, and the comparing and determining means further includes rolling code comparing and determining means for comparing the restored rolling code with an expected rolling code and for, when a difference therebetween is within a prescribed range, determining that the restored rolling code is correct.

4. The remote control system as set forth in claim 3, wherein, when it has been determined by the rolling code comparing and determining means that the restored rolling code is correct, the restored rolling code is stored.

5. The remote control system as set forth in claim 1, wherein:

a plurality of bit-data rearranging order settings are provided, each one of the plurality of bit-data rearranging order settings include an associated prescribed code and, when the transmitter transmits the transmission code, at least one of the bit-data rearranging order settings is set from among the plurality of bit-data rearranging order settings as the prescribed bit-data rearranging order setting, whereupon the associated prescribed code corresponding to the prescribed bit-data rearranging order setting is added to the transmission code by the transmission code producing means.

6. The remote control system as set forth in claim 5, wherein the prescribed bit-data rearranging order setting is selected from among the plurality of bit-data rearranging order settings by a random number.

7. The remote control system as set forth in claim 5, wherein:

the transmitter further includes:

transmission time period determining means for determining whether or not a prescribed time period has passed from a start of a transmission, wherein the bit-data rearranging means rearranges the position of each of the bits of the variable ID code and the position of each of the bits of the rolling code according to the prescribed bit-data rearranging order setting as preset, the transmission code producing means stopping the associated prescribed code from being added to the transmission code when the transmission time period determining means has determined that a time period from the start of the transmission is less than or equal to the prescribed time period, the bit-data rearranging means updating the prescribed bit-data rearranging order setting and rearranging the position of each of the bits of the variable ID code and the position of each of the bits of the rolling code according to the prescribed bit-data rearranging order setting being recently updated, and the transmission code producing means adding the associated prescribed code corresponding to the prescribed bit data rearranging order setting, being recently updated, to the transmission code when it has been determined that the time period from the start of the transmission is longer than the prescribed time period, and wherein the receiver further includes:

prescribed code addition determining means for, when receiving the transmission code from the transmitter, determining whether or not the associated prescribed code is added to the transmission code, the bit-data rearranging and restoring means rearranging each of the bits of the rearranged code according to the prescribed bit-data rearranging order setting corresponding to the associated prescribed code and storing the prescribed bit-data rearranging order setting when the associated prescribed code is added, and the bit-data rearranging and restoring means rearranging each of the bits of the rearranged code according to the prescribed bit-data rearranging order setting as preset when the associated prescribed code is not added to the transmission code.

8. The remote control system as set forth in claim 2, wherein:

the prescribed combination setting used by the operation processing means is one of a plurality of combination settings, and a prescribed combination code corresponding to the prescribed combination setting is added to the transmission code by the transmitter.

9. The remote control system as set forth in claim 7, further comprising:

means for transmitting a confirmation signal from the receiver to the transmitter indicating that the receiver has updated the prescribed bit-data rearranging order setting corresponding to the associated prescribed code in the transmission code.

10. A method for a remote control system having a transmitter for transmitting a transmission code including an ID code prepared by encoding specific identifying information and a receiver for receiving the transmission code transmitted from the transmitter, decoding the ID code and, when the ID code obtained by decoding thereof coincides with a preset ID code, outputting an instruction causing operation of a control object, said method comprising steps of:

varying a rolling code, including a prescribed number of bits, each time the transmitter transmits the transmission code;

performing an operation process with respect to each bit of the rolling code and each corresponding bit of the ID code, to vary each bit of the ID code in correspondence with the rolling code and thereby set a variable ID code;

determining an associated prescribed code of a prescribed bit-data rearranging order setting which is varied in each transmission operation of the transmitter, rearranging a position of each bit of the variable ID code and each of the bits of the rolling code according to the associated prescribed code of the prescribed bit-data rearranging order setting to set a rearranged code; and producing a transmission code from the rearranged code.

11. A method for a remote control system having a transmitter for transmitting a transmission code including an ID code prepared by encoding specific identifying information and a receiver for receiving the transmission code transmitted from the transmitter, decoding the ID code and, when the ID code obtained by decoding thereof coincides with a preset ID code, outputting an instruction causing operation of a control object, said method comprising of:

varying a rolling code including a prescribed number of bits, each time the transmitter transmits the transmission code;

performing an operation process with respect to each bit of the rolling code and each corresponding bit of the ID code, to vary each bit of the ID code in correspondence with the rolling code and thereby set a variable ID code;

determining whether or not a prescribed time period has passed from a start of a transmission;

rearranging the position of each bit of the variable ID code and each of the bits of the rolling code according to a prescribed bit-data rearranging order setting as preset to set a rearranged code, when the determining step determines that a time period from the start of the transmission is longer than the prescribed time period;

preventing an associated code corresponding to the prescribed bit-data rearranging order setting from being added to the transmission code when the determining step determines that the time period from the start of the transmission is less than or equal to the prescribed time period;

updating the prescribed bit-data rearranging order setting and rearranging the position of each of the bits of the variable ID code and the position of each of the bits of the rolling code according to the prescribed bit-data rearranging order setting to set the rearranged code, when the determining step determines that the time period from the start of the transmission is longer than the prescribed time period; and adding the associated prescribed code corresponding to the prescribed bit-data rearranging order setting to the transmission code when the determining step determines that the time period from the start of the transmission is longer than the prescribed time period; and producing the transmission code from the rearranged code.

12. A method for a remote control system having a transmitter for transmitting a transmission code including an ID code prepared by encoding specific identifying information and a receiver for receiving the transmission code transmitted from the transmitter, decoding the ID code and, where the ID code obtained by decoding thereof coincides with a preset ID code, outputting an instruction causing operation of a control object, said method comprising steps of:

extracting, when receiving the transmission code from the transmitter, a rearranged code including a variable ID code having a position of each bit rearranged and a rolling code having a position of each bit rearranged and rearranging bits of the rearranged code according to a prescribed bit-data rearranging order setting to thereby produce a restored variable ID code and a restored rolling code;

performing an inverse operation with respect to the restored variable ID code and the restored rolling code to thereby restore the ID code in correspondence with the restored rolling code; and comparing the ID code and the preset ID code in the receiver and, when the ID code and the preset ID code coincide, outputting a signal causing operation of the control object.

13. The method as set forth in claim 12, further comprising steps of:

determining whether or not an associated prescribed code corresponding to the prescribed bit-data rearranging order setting is added to the transmission code, when receiving the transmission code from the transmitter;

rearranging the bits of the rearranged code according to the prescribed bit-data rearranging order setting corresponding to the associated prescribed code and storing the prescribed bit-data rearranging order setting when the determining step determines that the associated prescribed code is added to the transmission code; and rearranging the bits of the rearranged code according to the prescribed bit-data rearranging order setting as preset when the determining step determines that the associated prescribed code is not added to the transmission code.

14. The method as set forth in claim 13, further comprising:

transmitting a confirmation signal from the receiver to the transmitter indicating that the prescribed bit-data rearranging order setting has been successfully updated according to the associated prescribed code in the transmission code.

15. A remote control system comprising:

a transmitter for transmitting a transmission code including an ID code prepared by encoding specific identifying information, the transmitter comprising:

rolling code varying means for, each time the transmitter transmits the transmission code, varying a rolling code comprising a prescribed number of bits, operation processing means for performing an operation process with respect to each bit of the rolling code and each corresponding bit of the ID code, to vary each bit of the ID code in correspondence with the rolling code and thereby set a variable ID code, bit-data rearranging means for rearranging a position of each bit of the variable ID code according to a prescribed bit-data rearranging order setting code varying for each transmission to set a rearranged code, and transmission code producing means for producing a transmission code from the rearranged code and the prescribed bit-data rearranging order setting code; and a receiver for receiving the transmission code transmitted from the transmitter, decoding the ID code and, when the ID code obtained by decoding thereof coincides with a preset ID code, outputting an instruction causing operation of a control object, the receiver comprising:

bit-data rearranging and restoring means for, when receiving the transmission code from the transmitter, extracting the rearranged code and rearranging each bit according to the prescribed bit-data rearranging order setting code to thereby set a restored variable ID code, operation processing and restoring means for restoring the ID code prepared in the transmitter from the restored variable ID code, and comparing and determining means for comparing the ID code and the preset ID code and, when the ID code and the preset ID code coincide, outputting a signal causing operation of the control object.

16. A remote control system comprising:

A transmitter for transmitting a transmission code including an ID code prepared by encoding specific identifying information, the transmitter comprising:

operation mode detecting means for detecting an operation mode of the transmitter, rearrangement order setting code determining means for determining a rearrangement order setting code which is varied when the operation mode detecting means detects a predetermined operation mode of the transmitter, rolling code varying means for, each time the transmitter transmits a transmission code, varying a rolling code including a prescribed number of bits;

operation processing means for performing an operation process with respect to each bit of the rolling code and each corresponding bit of the ID code, to vary each bit of the ID code in correspondence with the rolling code and thereby set a variable ID code, bit-data rearranging means for rearranging a position of each bit of the variable ID code according to the rearrangement order setting code to set a rearranged code, and transmission code producing means for producing the transmission code from the rearranged code and the rearrangement order setting code; and a receiver for receiving the transmission code transmitted from the transmitter, decoding the ID code and when the ID code obtained by decoding thereof coincides with a preset ID code, outputting an instruction causing operation of a control object, the receiver comprising:

memory means for storing the rearrangement order setting code therein, checking means for checking, when receiving the transmission code from the transmitter, whether the received transmission code includes a rearrangement order setting code, updating means for updating the rearrangement order setting code in the memory means to the received rearrangement order setting code, bit-data rearranging and restoring means for, extracting the rearranged code from the transmission code and rearranging bits of the rearranged code according to the rearrangement order setting code stored in the memory means to thereby produce a restored variable ID code, operation processing and restoring means for performing an inverse operation with respect to the restored variable ID code to produce a restored ID code, and comparing and determining means for comparing the restored ID code and the preset ID code in the receiver and, when the restored ID code and the preset ID code coincide, outputting a signal causing operation of the control object.

17. The remote control system as set forth in claim 13, wherein:

the transmitter further includes a plurality of switches corresponding to control objects to be controlled by the receiver, and the operation mode detection means detects an operation time period of the switches as an indication of the operation mode of the transmitter.

* * * * *